(12) United States Patent
Gregor et al.

(10) Patent No.: US 7,802,548 B2
(45) Date of Patent: Sep. 28, 2010

(54) CAMSHAFT ADJUSTING DEVICE

(75) Inventors: Matthias Gregor, Stuttgart (DE); Jens Meintschel, Esslingen (DE); Tilmann Römheld, Waiblingen (DE); Petra Schulz, Esslingen (DE); Thomas Stolk, Kirchheim (DE); Alexander von Gaisberg-Helfenberg, Beilstein (DE)

(73) Assignee: Daimler AG, Stuttgart (DE)

( * ) Notice: Subject to any disclaimer, the term of this patent is extended or adjusted under 35 U.S.C. 154(b) by 450 days.

(21) Appl. No.: 11/985,058

(22) Filed: Nov. 13, 2007

(65) Prior Publication Data

US 2008/0105078 A1 May 8, 2008

Related U.S. Application Data

(63) Continuation-in-part of application No. PCT/EP2006/004377, filed on May 10, 2006.

(30) Foreign Application Priority Data

May 13, 2005 (DE) .................. 10 2005 022 201

(51) Int. Cl.
F01L 1/34 (2006.01)
(52) U.S. Cl. ............ 123/90.17; 123/90.15; 251/129.16; 464/160
(58) Field of Classification Search ............ 123/90.15, 123/90.17, 90.11; 74/640; 251/129.01, 129.15, 251/129.16; 464/1, 2, 160
See application file for complete search history.

(56) References Cited

U.S. PATENT DOCUMENTS

| 5,299,451 | A | * | 4/1994 | Brosse | ............ 73/114.28 |
| 6,129,061 | A | * | 10/2000 | Okuda et al. | ............ 123/90.17 |
| 6,622,674 | B2 | * | 9/2003 | Kobayashi et al. | ....... 123/90.15 |
| 2002/0189563 | A1 | | 12/2002 | Muraki et al. | |
| 2003/0131812 | A1 | | 7/2003 | Hosoya | |
| 2003/0177992 | A1 | | 9/2003 | Takenaka et al. | |

FOREIGN PATENT DOCUMENTS

| DE | 196 40 943 | 5/1997 |
| DE | 102 24 446 | 12/2003 |
| EP | 0 918 142 | 5/1999 |

* cited by examiner

*Primary Examiner*—Ching Chang
(74) *Attorney, Agent, or Firm*—Klaus J. Bach

(57) ABSTRACT

In a camshaft adjusting device for adjusting a phase position of a camshaft, including a rotary actuator having a stator and at least one axially displaceable rotor and including a gear mechanism which is arranged operatively between two of at least three shafts, one of the shafts being a control shaft which is acted upon by the rotary actuator, one of the shafts being a drive shaft which is connected to the crankshaft, and one of the shafts being an output shaft which is connected to the camshaft, a compact locking structure is provided whereby at least two of the at least three shafts can be locked to one another in a rotationally fixed manner by a spring depending on operating conditions and released by an auxiliary coil which, upon energization, provides for axial movement of the rotor out of its locked position to permit adjustment thereof.

17 Claims, 5 Drawing Sheets

CAMSHAFT ADJUSTING DEVICE

This is a Continuation-In-Part Application of pending international patent application PCT/EP2006//004377 filed May 10, 2006 and claiming the priority of German patent application 10 2005 022 201.3 filed May 13, 2005.

BACKGROUND OF THE INVENTION

The present invention relates to a camshaft adjusting device, in particular a passive camshaft adjusting device, for controlling the phase position of a camshaft with a rotary actuator including a stator and an axially displaceable rotor and a gear mechanism arranged between two shafts for adjusting their relative angular positions.

It is known to change the phase position of a camshaft of an internal combustion engine by means of camshaft adjusting devices. It is also known to adjust the phase position by means of a brake. The variable moment of the brake at the control input of the gear mechanism of the camshaft adjusting device is utilized to change the phase position of the camshaft. Application of the brake causes the control shaft to slow down and therefore changes the phase position to advanced, for example via a negative gear mechanism. If the brake is released, the control input accelerates because of the load moment of the camshaft, and the phase position is retarded. At a constant phase position, the control shaft has to be kept at the rotational speed of the camshaft in such a manner that there is no relative movement in the gear mechanism. During starting of the internal combustion engine, at low rotational speeds and if the brake fails, the camshaft adjusting device has to be locked in a position customarily situated between end stops. Locking is also desirable in the event of failure of parts of the system, such as the brake, the control unit, the contact connection means, the sensor technology and the like, in order to permit emergency operation of the vehicle.

Laid-open specification DE 102 24 446 A1 discloses an electric adjusting device, in which a relative angular position of two shafts is brought about via a relative rotation of a control shaft which is operated by a rotor of an electromagnetic adjustment drive. If the adjustment drive is not energized, the axially movable rotor is operatively connected to a drive shaft, and therefore a relative rotation of the shafts with respect to each other is prevented. When the adjustment drive is energized, the operative connection between rotor and drive shaft is released by an axially effective magnetic force and the rotor can rotate the control shaft.

It is the principal object of the present invention to provide a camshaft adjusting device and a rotor for a camshaft adjusting device, which, while being cost effective and compact, is capable of locking the camshaft adjusting device.

SUMMARY OF THE INVENTION

In a camshaft adjusting device for adjusting a phase position of a camshaft, including a rotary actuator having a stator and at least one axially displaceable rotor and including a gear mechanism which is arranged operatively between two of at least three shafts, one of the shafts being a control shaft which is acted upon by the rotary actuator, one of the shafts being a drive shaft which is connected to the crankshaft, and one of the shafts being an output shaft which is connected to the camshaft, a compact locking structure is provided whereby at least two of the at least three shafts can be locked to one another in a rotationally fixed manner by a spring depending on operating conditions and released by an auxiliary coil which, upon energization, provides for axial movement of the rotor out of its locked position to permit adjustment thereof.

The locking means is expediently connected rotationally fixed to one of the shafts, preferably to the control input. In particular, the control input is formed by a support of a hysteresis band of the hysteresis brake. In a favorable configuration, the locking means connects a control input of a gear mechanism to a drive in a rotationally locked manner. The locking means can optionally connect a control input of the gear mechanism to the camshaft or, alternatively, can connect a drive of the camshaft to the camshaft for rotation therewith.

The auxiliary coil is preferably placed into a main magnetic circuit of the stator. In that case, a magnetic field of the coil has virtually no effect on the rotary actuator with regard to a control operation. The auxiliary coil produces only a force in the displacement direction, i.e. in the axial direction, but no torque, in particular no braking moment. Owing to the fact that the axial displacement of the rotor, which is brought about by the auxiliary coil being energized, does not produce any torque, the unlocking and the control operation are advantageously decoupled. The system is uncomplicated and can be very compact. The rotary actuator is preferably a rotor of a hysteresis brake.

Two of at least three shafts of a summing gear mechanism are preferably connected to one another in a rotationally locked manner. The connection of two shafts also fixes the rotational speed of the third shaft. The hysteresis brake and the activation thereof can then advantageously be smaller, since, in the event of cold starting at lower temperatures, a load moment of the camshaft does not have to be compensated for solely by the hysteresis brake or the camshaft adjusting device. Furthermore, control of the camshaft adjusting device during starting and running up of the internal combustion engine is simplified, since alternating moments of the camshaft at low rotational speeds can otherwise be controlled only with difficulty. When the internal combustion engine is switched off, the camshaft adjusting device can advantageously be moved into a position which is required for a subsequent starting, and can be locked there. The invention can expediently be used for all camshaft adjusting devices with a rotary actuator and summing gear mechanism.

For example, a compact, preferred arrangement is obtained if the auxiliary coil and the excitation coil are arranged coaxially. It is particularly advantageous if the auxiliary coil, as seen radially, is arranged within the excitation coil. The excitation coil and the auxiliary coil can be arranged coaxially or alternatively can be axially offset. If the auxiliary coil is arranged closer to the rotor, an effect on the control operation by the auxiliary coil can be avoided even more easily. Since, at a smaller distance, a smaller magnetic field is sufficient, a smaller auxiliary coil can be used.

A favorable arrangement is obtained if the rotor can be engaged by means of an armature, as a function of the auxiliary coil being energized, in an air gap of the stator, which air gap is assigned to the auxiliary coil. This permits a simple construction of the rotor which, for example in the form of a hysteresis brake, engages by means of a circular, soft magnetic band in an air gap of the stator. The armature can be arranged coaxially with respect to the band.

A spring element which acts counter to the direction of a magnetic force of the auxiliary coil is preferably provided for the locking. The spring element is designed in the manner of a compression spring and presses the rotor out of the stator until it enters into operative connection with a locking mechanism. The locking position can accordingly be maintained without an additional power. The arrangement can be unlocked by means of the auxiliary coil being energized, with a magnetic force being built up which overcomes the spring force and displaces the rotor axially toward the stator.

The rotor can expediently be moved into a locking position with a locking means for locking it with one of the two other shafts. The locking means can be a form-fitting structure, for example a latching means in the form of a lug and groove; in principle, however, frictional locking with a friction lining or the like is also conceivable. If a plurality of locking means are provided, or even in the case of frictional locking, it is possible to lock the camshaft adjusting device at a constant phase position. Individual locking points can be selected as a function of operating conditions. Furthermore, the loading apportioned to the individual locking means is reduced at the various locking points. It is also possible to actuate a separate locking mechanism, for example a detent pawl, with the axially displaceable rotor. A frictional connection of the two shafts can be expedient if spring forces and/or magnetic forces required for the locking and/or unlocking are available. If this is the case, the camshaft adjusting device can be locked in every position.

The gear mechanism is preferably a summing gear mechanism, in particular a single-stage planetary gear mechanism. The gear mechanism is expediently self-locking.

Preferably, the excitation coil and the auxiliary coil have a common electric power supply unit.

A rotor of a camshaft adjusting device includes an armature of a soft magnetic material which is arranged coaxially with respect to an outer wall which also consists of soft magnetic material and has a smaller radius than the outer wall.

A symmetrical arrangement is provided if a rotor shaft is arranged centrally on the armature-side in a cup-like form. The rotor shaft preferably extends to the outside as a hollow shaft with an external toothing.

A rotor according to the invention for a camshaft adjusting device has a cup-like form, with an outer wall formed from soft magnetic material, and an annular armature of soft magnetic material being arranged concentrically with respect to the outer wall.

The armature can be annular and disposed within the outer wall. As an alternative, the armature can be arranged on the rotor shaft. The armature can also be formed integrally with the rotor shaft.

At least one locking means, such as, for example, a latching means, is preferably arranged on the rotor opposite the armature and, after installation, cooperates with another latching means.

A plurality of locking means which are arranged on different radii are preferably provided. This is advantageous if a particular defined locking position is to be achieved. After installation of the rotor in a rotary actuator of a camshaft adjusting device, it can be prevented that a plurality of locking options are produced at customary gear mechanism transmission ratios of approximately 7 to approximately 15 and customary control regions with crank angles of around 100°.

The invention will be explained in greater detail based on an exemplary embodiment described below with reference to the accompanying drawings.

DESCRIPTION OF A PARTICULAR EMBODIMENT

Figure 1:
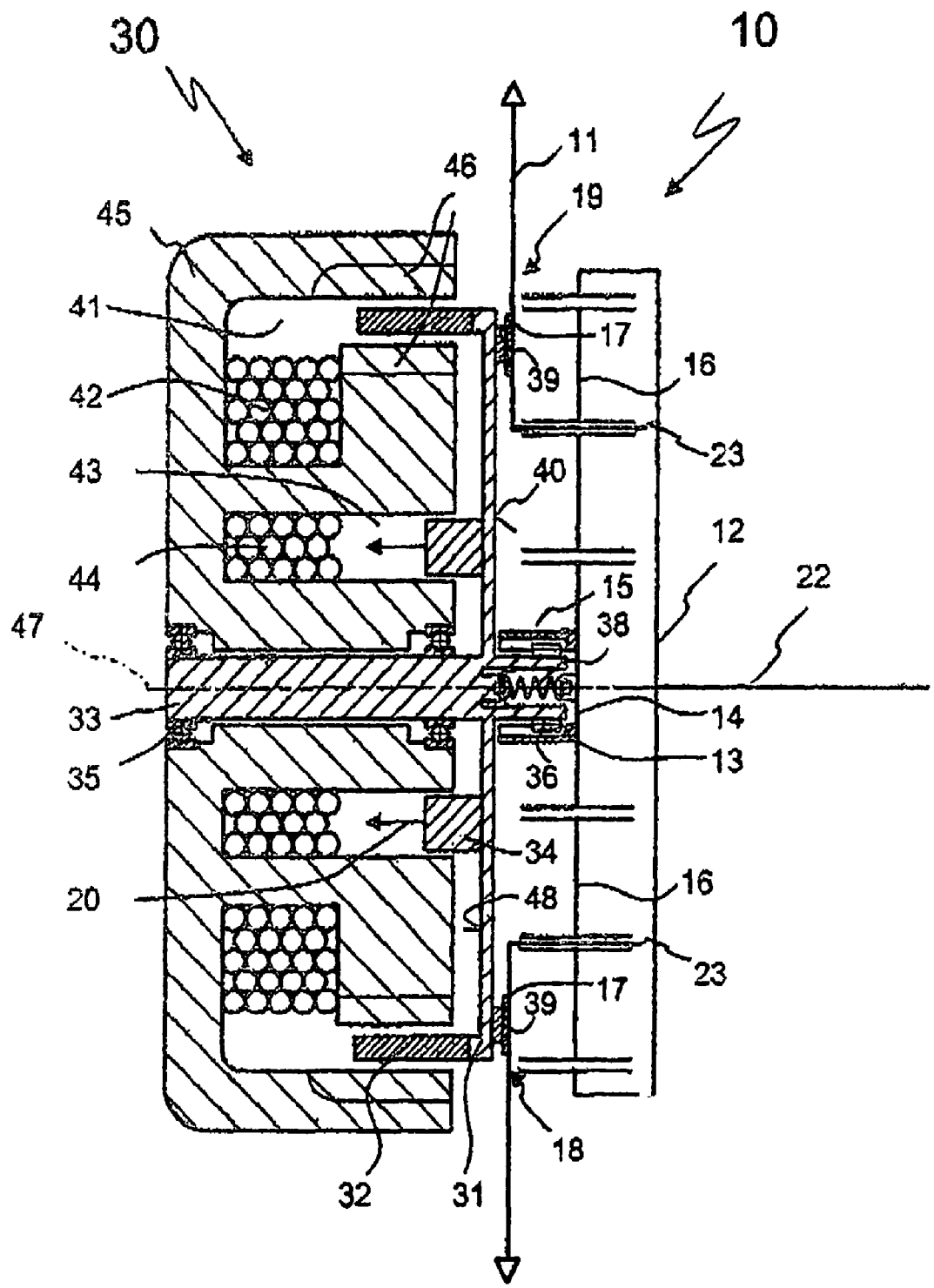
FIG. 1 shows a camshaft adjusting device with a hysteresis brake as the adjustment unit and a rotor, which is displaced in the axial direction by spring force of a spring element, in the locked position.

FIG. 1 shows a longitudinal section through a preferred camshaft adjusting device for adjusting a phase position of a camshaft, with three shafts: a drive shaft 11, which is operatively connected to the crankshaft of an internal combustion engine and is connected to a drive wheel at the gear mechanism input, an output shaft 12, which is connected to the camshaft at the gear mechanism output which is connected to a camshaft 22, and a control shaft 13 which is connected to a rotary actuator that is a rotor 31.

The camshaft adjusting device is shown in a locked position in which no adjustment of the phase position takes place and in which the rotor 31 is connected to the drive shaft 11 in a form-fitting manner.

The rotor 31 is part of an adjustment unit 30 which includes a hysteresis brake and comprises a stator 45 which has an excitation coil 42 in a cutout 41. The excitation coil 42 is part of the magnetic circuit of the hysteresis brake. A hysteresis band which forms an outer wall 32 of the rotor 31 of cup-like design is accommodated in said cutout 41. On both the radially inner and outer sides of the engagement region of the wall 32, which forms a hysteresis band, a pole structure 46 is provided in the stator 45, for example by geometrical shaping and/or by corresponding magnetization of the material itself. Upon a rotational movement of the wall 32, which is designed as a hysteresis band, about an axis 47 in a manner known per se, the material exerts a braking moment on the rotor 31 and thus brings about an adjustment of the phase position between drive shaft 11 and output shaft 12.

The drive shaft or drive 11 is preferably a chain wheel. The camshaft 22 is driven via the chain wheel, and both the camshaft 22 and the chain wheel have the same rotational speed.

The drive shaft 11 is connected to the output shaft 12 via a gear mechanism 10 which is preferably a summing gear mechanism. The output shaft 12 is designed as a crown wheel with an internal toothing in which a single-stage planetary gear mechanism is arranged. The drive shaft 11 is connected to a planet carrier 23, the planet wheels 16 of which engage a sun wheel 14 and at the same time mesh with the crown wheel. Of course, more than two planet wheels 16 can also be provided. Drive shaft 11, output shaft 12 and control shaft 13 and also, correspondingly, the rotor 31 rotate about the same axis 47. The sun wheel 14 is connected to the rotor 31 in a rotationally fixed manner.

The cup-shaped rotor 31 according to the invention has, on its inner region, which is a cup base, with an outside 40 and an inside 48 within the circumferential wall 32 which is formed from magnetically semi-hard material, an annular armature 34 of soft magnetic material, which is arranged concentrically with respect to the wall 32. Locking means 39 formed by two locking points 18, 19 are arranged on the outside 40 opposite the armature 34.

A rotor shaft 33 is arranged centrally on the armature-side inside 48 in the cup-like form and continues on the outside 40 as a hollow shaft with an external toothing 36 which engages in the control shaft 13 of the gear mechanism 10. The rotor shaft 33 is supported at two points within the stator 45 by a rolling contact bearing 35. The external toothing 36 is part of a coupling 15 which permits axial displacement, for example a splined shaft coupling. A spring element 38 is arranged in an interior space formed in the extension of the rotor shaft 33 that is a hollow shaft extension.

The armature 34 can move into a cutout 43 of the stator 45, in which an auxiliary coil 44 is arranged. The latter is arranged so as to extend about the same axis 47 as the excitation coil 42 and, as seen radially, lies within the excitation coil 42. The arrangement shown is concentric, and both coils lie in the same axial area. If the auxiliary coil 44 is energized, it exerts an axially directed magnetic force on the armature 34 in a direction indicated by arrows 20 and attracts the armature. As a result, the rotor 31 can be released from the drive shaft 11; the camshaft adjusting device is unlocked. The spring element 38 which acts counter to the direction of the arrows 20 of the magnetic force of the auxiliary coil 44 is provided for the locking of the rotor 31. For the locking, the rotor 31 can be moved into a locking position by a locking means 17 of the drive shaft 11 and can be locked there by its locking means 39, which is designed as a latching lug, in a locking groove 19 of the drive shaft 11.

At least two of the at least three shafts 11, 12, 13 can be locked to each other in a rotationally fixed manner as a function of operating conditions.

Figure 2:
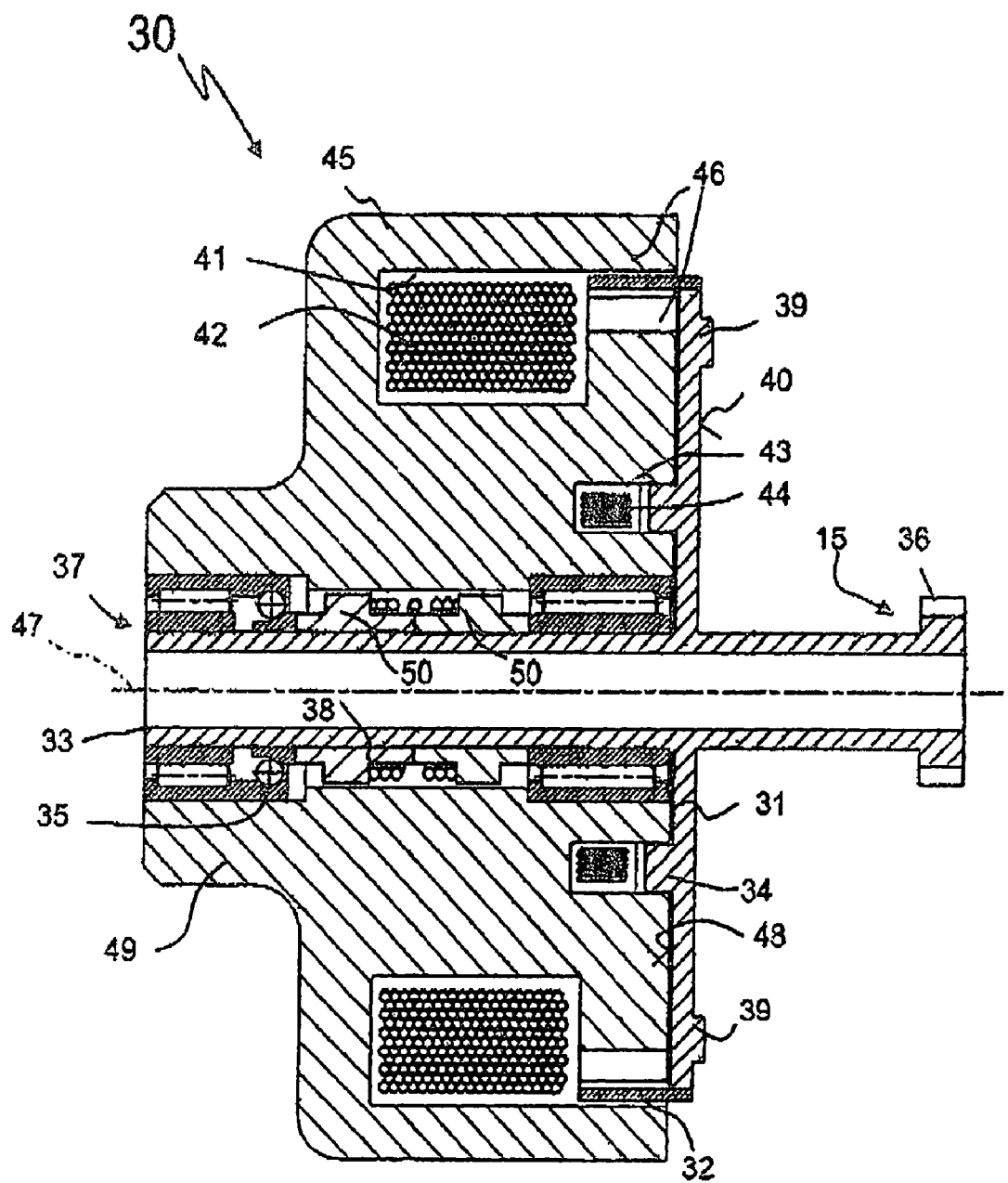
FIG. 2 shows a hysteresis brake with a rotor, which is displaced in the axial direction by the magnetic flux of an auxiliary coil in the stator of the hysteresis brake, in the unlocked position.

An expedient further refinement of the camshaft adjusting device according to the invention can be seen in FIG. 2 with reference to an adjustment unit 30. The gear mechanism unit 10 of the camshaft adjustment unit is not illustrated but corresponds to the one in FIG. 1. The arrangement largely corresponds to the one in FIG. 1, to which reference is made for the description of the individual elements. Furthermore, elements which are identical or act in a functionally identical manner are numbered with the same reference numbers in all of the figures.

An auxiliary coil 44 for the axial movement of a rotor 31 is arranged in the stator 45 as is an excitation coil 42 of the adjustment unit 30. In contrast to the configuration according to FIG. 1, the auxiliary coil 44 is not only arranged radially but, as seen axially, is axially staggered with respect to the excitation coil 42. An armature 34 of soft magnetic material is fastened to an inside 48 of the rotor 31 or to part of the rotor 31. Locking means 39 designed as lugs are located on the outside 40 of the rotor 31. The auxiliary coil 44 is formed closer to an armature 34 and smaller than in the exemplary embodiment of FIG. 1.

The rotor shaft 33 is hollow and extends through the stator 45 of the adjustment unit 30 which forms a hysteresis brake. The stator 45 peters out on its side facing away from the rotor 31 into a connecting branch 49. A coupling 15 which permits axial displacement is integrated into an end-side toothing 36. A combined radial and axial bearing 37 is arranged in the stator 45 and, by means of a rolling contact bearing 35, supports the rotor shaft axially in the stator 45. The rotor shaft 33 protrudes as a connecting branch on the outside 40 of the rotor 31 and ends in the end-side external toothing 36 which can be coupled to a (not illustrated) gear mechanism 10 (FIG. 1). The rotor 31 is mounted rotatably and axially displaceably by the corresponding design of the bearings, and therefore can be connected to the control input of the gear mechanism 10.

Without the auxiliary coil 44 being energized, a rotationally fixed connection to the gear mechanism input (drive shaft 11, FIG. 1) or to the gear mechanism output (output shaft 12, FIG. 1) can be established. For this purpose, cutouts for the locking means 39, which are designed as lugs, are provided on the gear mechanism part concerned. For the locking, a spring element 38 in the form of a compression spring is arranged around the rotor shaft 33 in an optimum manner in terms of construction space and abuts two seats 50 (FIG. 2) which are displaceable along the rotor shaft 33 and are supported on the combined radial and axial bearing 37 and the rotor. The combined radial and axial bearing 37 also accommodates an axial force which acts on the rotor 31 in the unlocked state.

Figure 3:
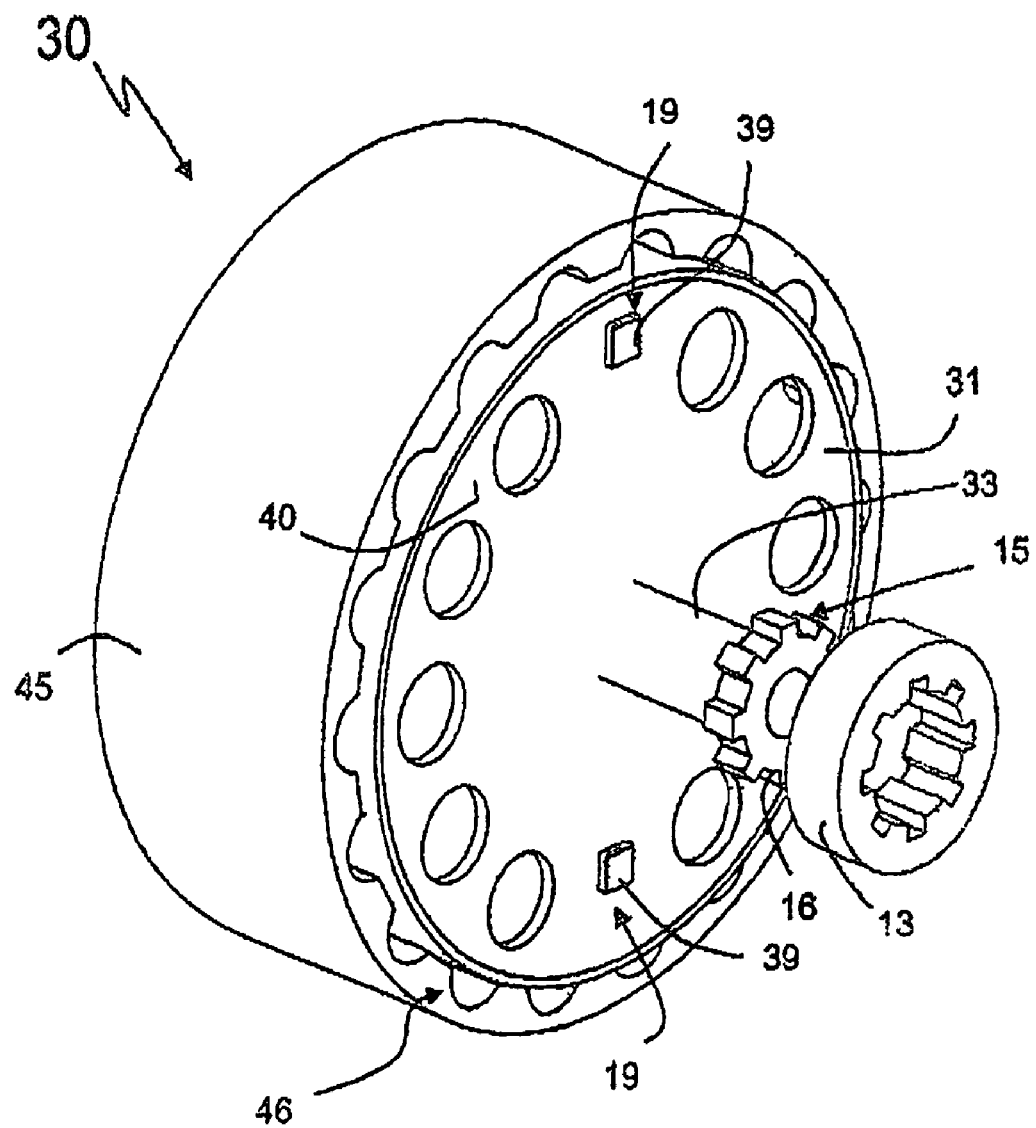
FIG. 3 shows an isometric view of a system with an auxiliary coil according to FIG. 2, FIGS. 4a, 4b show flux lines of the magnetic circuit according to FIG. 2 with the auxiliary coil and the excitation coil energized.

In order to illustrate the arrangement of FIG. 2, FIG. 3 shows the outside 40 of the rotor 31 with a stator 45 in a perspective view. The arrangement of two locking means 39, which are designed as lugs, on different radii can be seen. This arrangement ensures that locking is possible only in a single defined position. Furthermore, a customary pole structure 46, in the form of a tooth structure of the adjustment unit 30, which forms a hysteresis brake, can be seen. A further pole structure, which is concealed by the rotor 31 and is also designed as tooth structure, is disposed opposite the visible pole structure 46, with the radially opposite rows of teeth having teeth which are arranged offset in relation to one another.

Figures 4A, 4B:
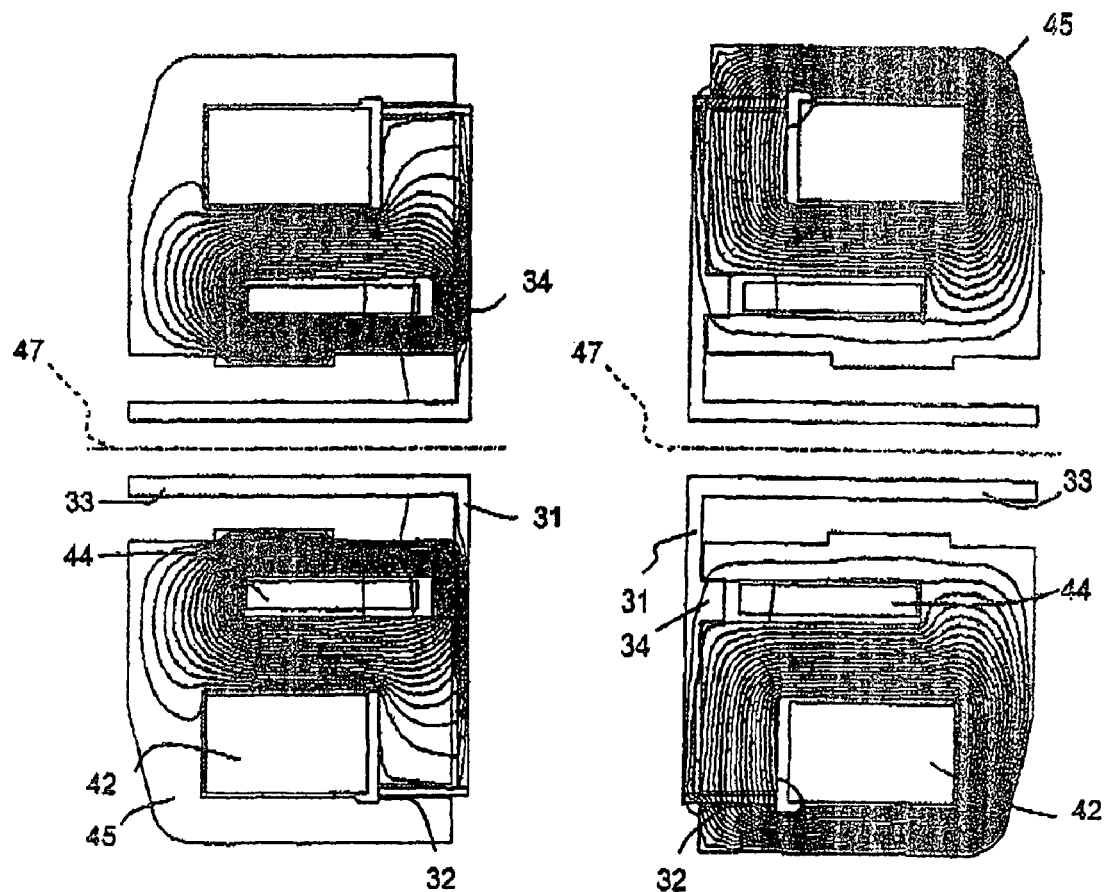

FIGS. 4a and 4b illustrate a profile of flux lines of the magnetic circuit of an arrangement according to FIG. 1 or FIG. 2 with the auxiliary coil (4a) energized and the excitation coil (4b) energized. The arrangement is arranged rotationally symmetrically about the axis 47. When the auxiliary coil 44 is energized, it can be seen that there is a very high density of flux lines about the region of an armature 34 of the rotor 31. The armature 34 has a high flux line density passing through it and is drawn toward the auxiliary coil 44 by the correspondingly formed magnetic force. By contrast, the wall 32 of the cup-shaped rotor 31, which wall is designed as a soft magnetic band, is virtually free from flux lines and is therefore virtually unaffected by the auxiliary coil 44 being energized. Accordingly, the auxiliary coil 44 does not exert any torque on the rotor 31 of the adjustment unit 30 which is designed as a hysteresis brake.

By contrast, when the excitation coil 42 is energized, as FIG. 4b shows, the region of the armature 34 is virtually free of flux lines while the region of the band of the rotor 31 has flux lines passing densely through it, which exerts a corresponding braking moment on the rotor 31.

Figure 5:
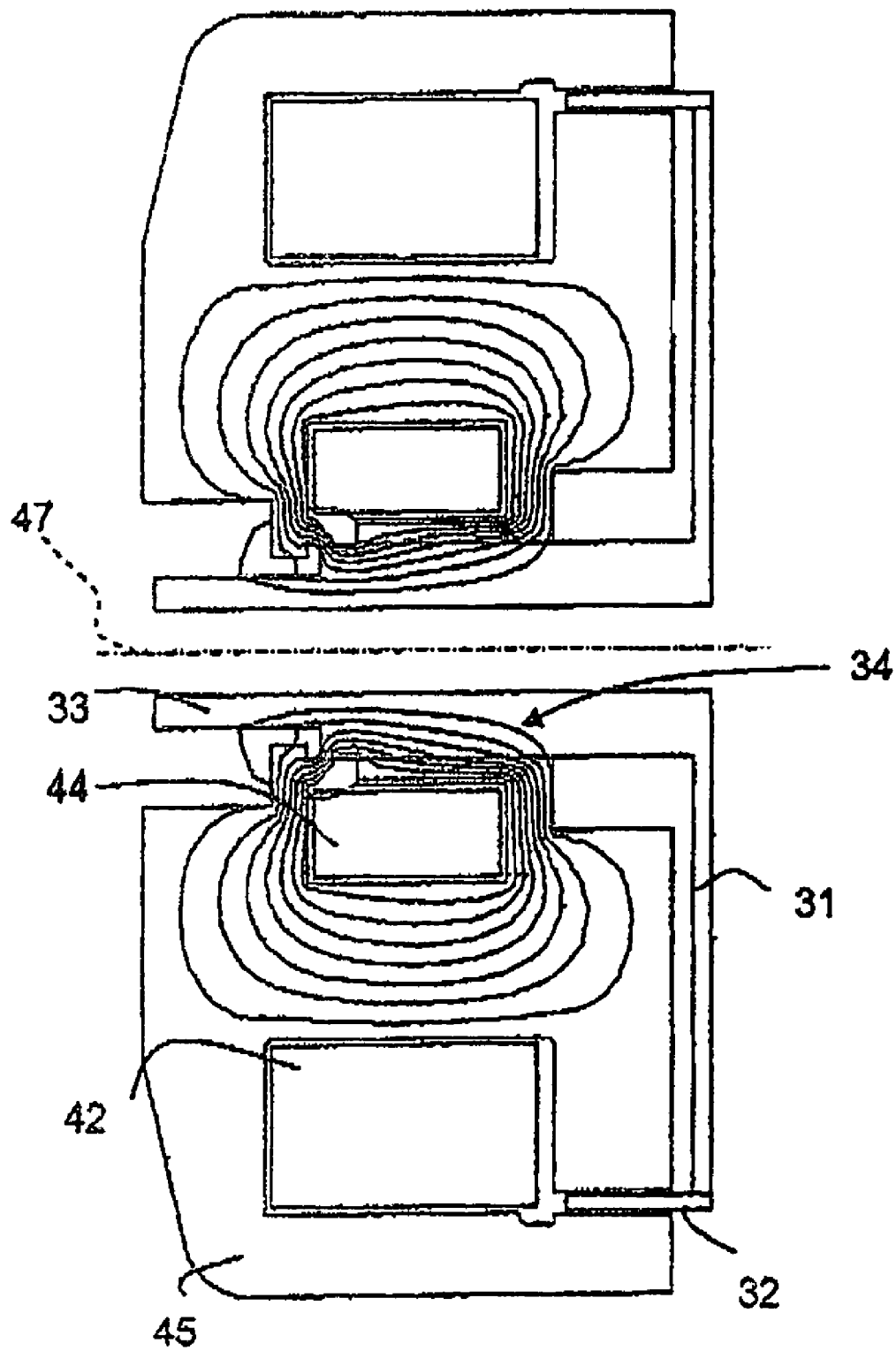
FIG. 5 shows flux lines of a magnetic circuit with a central armature which is arranged directly on a rotor shaft.

FIG. 5 illustrates a flux line profile of an arrangement in which an armature 34 is not arranged on an inside 48 of a rotor 31 but rather surrounds a rotor shaft 33 of the rotor 31 within a stator 45. Otherwise, the arrangement of the camshaft adjustment unit corresponds to FIG. 1 or 2 to which reference can be made for the description. When the auxiliary coil 44 is energized, the flux lines are concentrated in the region of the armature 34 while outside it the flux line density is very low.

What is claimed is:

1. A camshaft adjusting device for adjusting a phase position of a camshaft with respect to a crankshaft, comprising a rotary actuator having an arm (47) and including an a stator (45) and at least one axially displaceable rotor (31), and a gear mechanism (10) arranged between two of at least three shafts (11, 12, 13), one of the shafts, being a control shaft (13) acted upon by the rotary actuator, another one of the shafts being a drive shaft (11) connected to the crankshaft, and one of the shafts being an output shaft (12) connected to the camshaft, and means for locking at least two of the at least three shafts (11, 12, 13) to one another in a rotationally fixed manner, as a function of operating conditions, via an excitation coil (42) for acting on the rotary actuator, and an auxiliary coil (44) for axially moving the rotor (31) at least in one direction (20) out of engagement with the drive shaft (11), the auxiliary coil (44) being disposed in an annular recess (43) into which also an armature (34) connected to the rotor (31) extends, so that, upon energization of the auxiliary coil (44), the rotor (31) is drawn by means of the armature (34) into the annular recess (43) of the stator (45).

2. The camshaft adjusting device as claimed in claim 1, wherein the auxiliary coil (44) and the excitation coil (42) are arranged coaxially with the axis (47) of the rotary actuator.

3. The camshaft adjusting device as claimed in claim 1, wherein the auxiliary coil (44) is arranged radially within the excitation coil (42).

4. The camshaft adjusting device as claimed in claim 3, wherein the auxiliary coil (44) is arranged axially offset with respect to the excitation coil (42).

5. The camshaft adjusting device as claimed in claim 1, wherein the rotor (31) includes locking means (17) which, upon movement of the rotor into a latching position, lock the rotor (31) to one of the two other shafts (11).

6. The camshaft adjusting device as claimed in claim 5, wherein a plurality of locking points (18, 19) are provided for the locking of the rotor (31).

7. The camshaft adjusting device as claimed in claim 6, wherein individual locking points (18, 19) can be selected as a function of operating conditions.

8. The camshaft adjusting device as claimed in claim 1, wherein the gear mechanism (10) is a summing gear mechanism.

9. The camshaft adjusting device as claimed in claim 1, wherein the gear mechanism (10) is self-locking.

10. The camshaft adjusting device as claimed in claim 1, wherein the excitation coil (42) and the auxiliary coil (44) have a common electric power supply.

11. The camshaft adjusting device as claimed in claim 1, wherein the rotor (31) is cup-shaped and the armature (34) is formed from soft magnetic material and arranged coaxially with respect to an outer wall (32) which is formed from soft magnetic material, the armature (34) having a smaller radius than the outer wall (32).

12. The camshaft adjusting device as claimed in claim 11, wherein a rotor shaft (33) is arranged centrally in the cup-shaped rotor.

13. The camshaft adjusting device as claimed in claim 12, wherein the rotor shaft (33) continues on the outside (40) as a hollow shaft and is provided with an external toothing (36).

14. The camshaft adjusting device as claimed in claim 11, wherein the armature (34) is of annular design within the outer wall (32).

15. The camshaft adjusting device as claimed in claim 11, wherein the armature (34) is arranged on the rotor shaft (33).

16. The camshaft adjusting device as claimed in claim 11, wherein at least one locking means (39) is arranged on an outside (40) opposite the armature (34).

17. The camshaft adjusting device as claimed in claim 11, wherein a plurality of locking means (39), which are arranged on different radii, are provided.

* * * * *